Jan. 5, 1960 W. G. SIMMONS 2,919,888
TURBINE BEARING SUPPORT
Filed April 17, 1957 2 Sheets-Sheet 1

INVENTOR
WILBUR G. SIMMONS
BY Charles A. Warren
ATTORNEY

Jan. 5, 1960  W. G. SIMMONS  2,919,888
TURBINE BEARING SUPPORT
Filed April 17, 1957  2 Sheets-Sheet 2

INVENTOR
WILBUR G. SIMMONS
BY Charles A. Warren
ATTORNEY

United States Patent Office 2,919,888
Patented Jan. 5, 1960

2,919,888

TURBINE BEARING SUPPORT

Wilbur G. Simmons, Simsbury, Conn., assignor to United Aircraft Corporation, East Hartford, Conn., a corporation of Delaware Application April 17, 1957, Serial No. 653,496

7 Claims. (Cl. 253—39)

This invention relates to a bearing support for use particularly in a jet engine and is more especially directed to the support for the bearing located downstream of the last turbine stage of the jet engine.

The exhaust gas from the turbine is discharged in the form of an annulus and the bearing for the turbine is supported within the anulus by supporting structures, such as rods or pins or the equivalent, which extend through the annulus of hot gas and provide a mounting which retains the bearing in concentric position with respect to the outer wall of the gas path, this outer wall being generally a part of the frame structure for the engine. One example of an engine of the type for which the present invention is adapted is disclosed in the Savin Patent No. 2,747,367. Because of the thermal expansion problems involved, it is difficult to provide a supporting structure which will maintain the bearing in concentricity with the casing or outer wall at all times. A feature of this invention is an arrangement for supporting the bearing housing in position within the casing and also supporting the inner wall of the annular gas path both with a minimum of stress on the parts resulting from the gas pressure loading and from thermal expansion.

The co-pending application of May, Serial No. 650,476, filed April 3, 1957, now Patent 2,829,014, discloses the use of a tension ring to which the radially extending tension rods are attached at their inner ends and the radially slidable connection between the bearing housing and the tension ring. One feature of the present invention is the support of the fairings around the tension rods and the support of the inner wall of the gas path with a minimum of loading on these parts.

This invention is in some respects a refinement of or an addition to the invention disclosed in said May application Serial No. 650,476 and is concerned with the mounting of the fairings around the tension rods with these fairings supported from the outer case, and is also concerned with the support of the inner gas path wall or the fairing around the bearing housing primarily from these rod fairings with a provision for expansion and contraction of the several parts.

Other features and advantages will be apparent from the specification and claims, and from the accompanying drawings which illustrate an embodiment of the invention.

Figure 1:
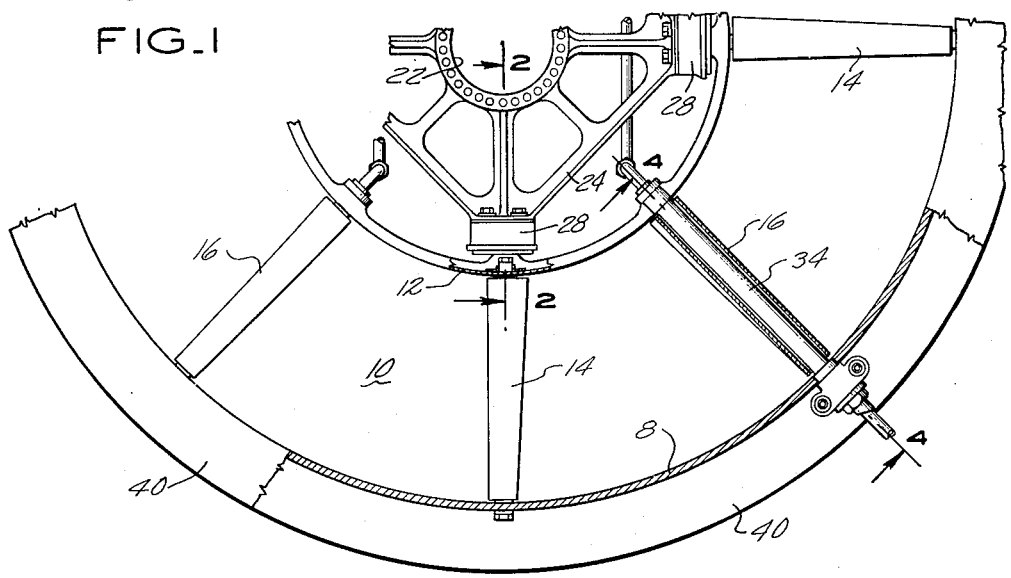
Fig. 1 is a transverse fragmentary sectional view of a turbine bearing support.
Figure 2:
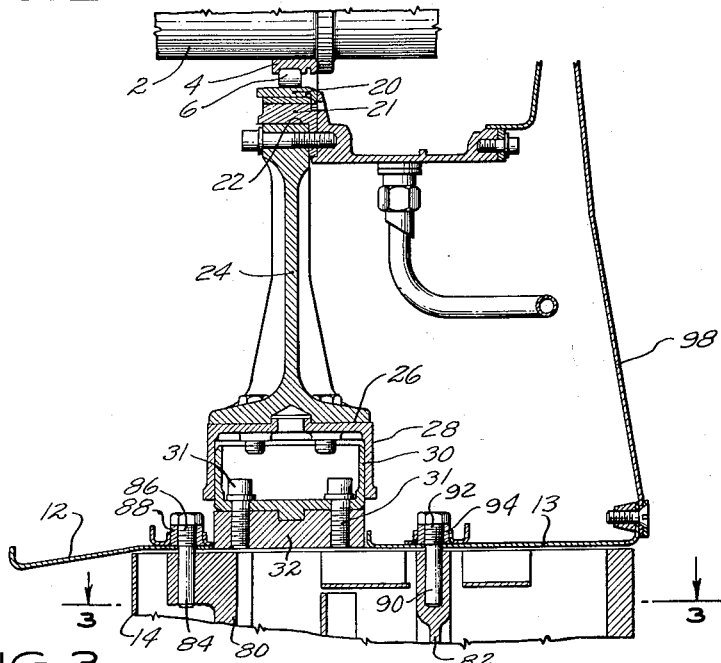
Fig. 2 is an axial sectional view along the line 2—2 of Fig. 1.

With reference first to Figs. 1 and 2, the turbine shaft 2 carries thereon the inner race 4 of the bearing 6 which supports the shaft 2 concentrically within the outer casing 8, Fig. 1. This casing forms the outer wall of the annular duct 10 through which the exhaust gas from the turbine is discharged. The inner wall of the exhaust duct is formed by axially aligned substantially cylindrical sleeves 12 and 13 or annular fairings which are supported in spaced relation to the outer wall by sets of radially extending vanes 14 and 16. As indicated by the sectional view of Fig. 1, the vanes 14 alternate with the vanes 16 and the vanes in each set are spaced approximately 90° apart. The vanes 14 function to direct the flow of air and to support in part the inner wall of the exhaust duct. The vanes 16 surround tension or support rods 17 which support the bearing within the outer casing and these vanes also serve to support in part the inner wall of the duct.

The arrangement shown is intended for use on the downstream side of a turbine disc in an axial flow gas turbine power plant as shown, for example, in the Savin Patent 2,747,367. The casing 8 is attached at its forward end to the turbine casing 18 and is held concentric therewith, as by means of the pilot flange 19. The tension rods thus in effect support the bearing in concentric relation to the turbine casing.

The outer race 20 of the bearing 6 is supported within a ring 21, which in turn, is supported within the central bore 22 of the bearing housing 24. As best shown in Fig. 1, this housing is a relatively open-work structure for the purpose of lightness and has four mounting pads 26 located at 90° apart. These pads have their mounting surfaces facing outwardly from the axis of the housing.

Each mounting pad 26 has bolted thereto the cup or cylinder 28 of a dash-pot, the piston or plunger 30 of which is received within the cup in such a manner that the plunger is radially movable with respect to the housing. Each plunger 30 is secured, as by bolts 31 to a spring ring 32 also concentric to the axis of the housing. The outer surface of the spring ring 32 coincides with the inner wall 12 of the gas path. With this arrangement of dashpots the spring ring 32 supports the bearing concentrically therein with thermal expansion being permitted by the dashpots.

The ring 32 is supported from the outer casing 8 by the tension rods 17 which are connected to the ring 32 at points angularly offset from the dashpots, as best shown in Fig. 2. In the arrangement shown the tension rods are located midway between the dashpots, being spaced 90° from each other and 45° from each of the dashpots. Each tension rod 17 has a flange 36 at its inner end which is secured by bolts 38 to the inner surface of the ring 32 and projects radially outward through an opening in the ring and across the gas path.

The outer end of the tension rod projects between spaced radial flanges 40 projecting from the outer surface of the casing 8 and providing a comparatively rigid support for the outer ends of the rods. A bracket 42 which is located between the flanges 40 has spaced parallel bores 44 which receive bolts 46 that support the bracket securely between the flanges 40. This bracket has a central radially extending opening 48 through which the tension rod extends. A clamping nut 50 is threaded on the end of the tension rod. A suitable locking nut 52 may be used to retain the nut 50 in position. The tension rods, spring ring and dashpot arrangement are described and claimed in the co-pending application of May, Serial No. 650,476, filed April 3, 1957.

As shown, one or more of the tension rods may be hollow for the support of a tube 54 therethrough by which, for example, lubricant may be delivered to or scavenged from the bearing. This tube may have a flange 56 on the outer end clamped as by a ring 58 to hold the tube radially in position within the rod. By the arrangement described, it will be apparent that the bearing is supported directly from the outer casing 8 by means of the tension rods and the spring rings and thence through the dashpots to the bearing housing.

Figure 4:
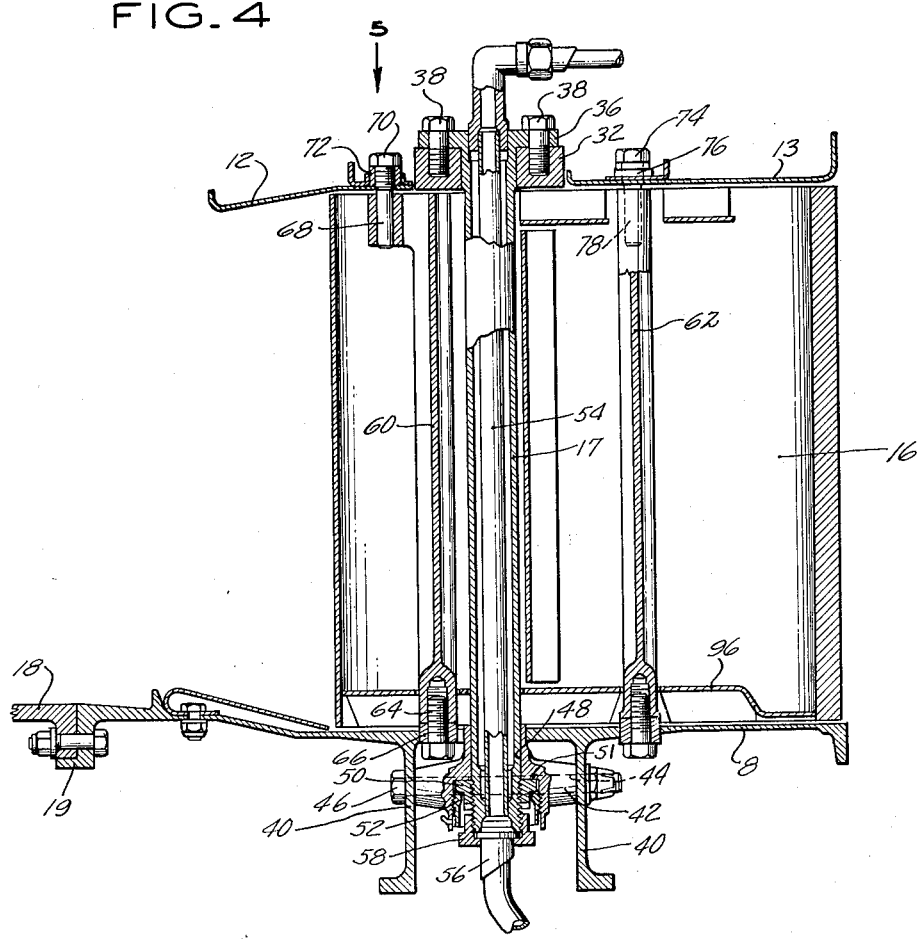
Fig. 4 is a sectional view substantially along line 4—4 of Fig. 1.

Each of the tension rods 17 is shielded from the exhaust gases by the fairing or vane 16 which is airfoil in shape and has two stiffening supports 60 and 62 which extend radially within the fairing and function to hold the fairing in shape and in the proper position with respect to the casing 8. To accomplish this the supports 60 and 62, which are rigidly secured within the vane or fairing in axially spaced relation to each other, are securely attached to the casing 8 by bolts 64. These bolts pass through rings 66 welded to the casing 8 and projecting radially inward from the casing a small amount, as shown in Fig. 4. The bolts are slidable in these rings and threaded into the end bosses in the supports 60 and 62 to hold the outer ends of the supports securely against the rings 66. The rings hold the outer end of the vane 16 in closely spaced relation to casing 8.

At their inner ends, support 60 slidably receives a pin 68 integral with a stud 70 threaded in a ring 72 welded to the sleeve 12. The several supports 60 in the several vanes 16 thus serve to support sleeve 12 in position but without transmitting any of the pressure loads on sleeve 12 to the spring ring 32 or to the tension rods 17. The several supports 62 have similar attachments to sleeve 13 or tailcone fairing in that each of the studs 74 is threaded in a ring 76 in sleeve 13 and has an integral projecting pin 78 slidable in the end of support 62. The sleeve 13 is accordingly supported in position without imparting any loading to the spring ring or tension rods. The pins 68 and 78 permit thermal expansion of the parts without affecting concentricity and without distortion.

Figure 3:
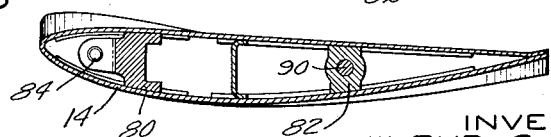
Fig. 3 is a sectional view substantially along the line 3—3 of Fig. 2.
Figure 5:
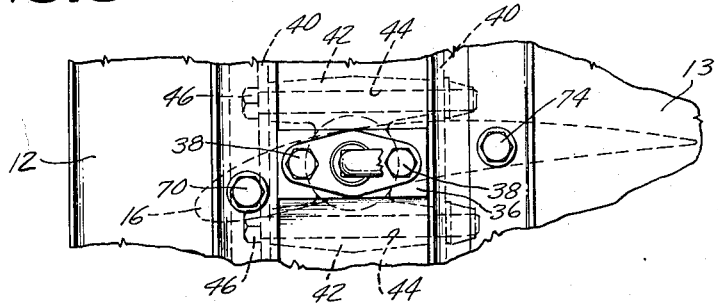
Fig. 5 is a plan view looking substantially in the direction of the arrow 5 of Fig. 4.

The vanes 14, which are interposed between adjacent vanes 16 are similar in construction, as shown in Figs. 2 and 3, in which the support 80 and 82 extend radially within the vane and are attached thereto. At the inner end support 80 receives the projecting pin 84 on the stud 86 threaded in a ring 88 in sleeve 12, and support 82 receives the projecting pin 90 on a stud 92 threaded in a ring 94 in the sleeve 13. The outer end attachment is the same as described with reference to vanes 16. Each set of vanes has an outer end 96 positioned therein as by welding, as shown in Fig. 4.

The sleeves 12 and 13 form, with the ring 32, an enclosure for the bearing housing and the end of the shaft 2 supported by the bearing. Since the pressure loads on the sleeves 12 and 13 and the end plate 98, Fig. 2, are transmitted through the vanes to the casing without any loading of the spring ring or tension rods, it will be apparent that the bearing support can be lighter since it will be relatively free of loads other than the radial loads from the shaft.

It is to be understood that the invention is not limited to the specific embodiment herein illustrated and described, but may be used in other ways without departure from its spirit as defined by the following claims.

I claim:

1. A bearing support including a shaft, a bearing supporting the shaft, a housing supporting the bearing and surrounding the shaft, a ring surrounding the housing with means holding the housing concentric to the ring, an outer casing around the housing, rods extending between the ring and said casing to hold the ring in position, and a fairing surrounding each rod and extending inwardly from the casing, in combination with means for attaching the fairing for each rod rigidly to the casing, a tailcone fairing surrounding the housing and a radially slidable connection between the inner end of each rod fairing and the tailcone.

2. A bearing support including a shaft, a bearing supporting the shaft, a housing supporting the bearing and surrounding the shaft, a ring surrounding the housing with means holding the housing concentric to the ring, an outer casing around the housing, rods extending between the ring and said casing to hold the ring in position, and a fairing surrounding each rod and extending inwardly from the casing, in combination with means for attaching the fairing for each rod rigidly to the casing, a tailcone fairing surrounding the housing and a radially slidable connection between the inner end of each rod fairing and the tailcone, the tailcone fairing being out of contact with said ring.

3. A bearing support including a shaft, a bearing supporting the shaft, a housing supporting the bearing and surrounding the shaft, a ring surrounding the housing with means holding the housing concentric to the ring, an outer casing around the housing, rods extending between the ring and said casing to hold the ring in position, and a fairing surrounding each rod and extending inwardly from the casing, in combination with means for attaching the fairing for each rod rigidly to the casing, and a two-part tailcone fairing surrounding the housing, one part of the tailcone fairing being on each side of the ring and being spaced therefrom, and a radially slidable connection between each of said parts and the rod fairings.

4. A bearing support including a housing, a shaft in the housing, a bearing supporting the shaft within the housing, a ring surrounding the housing with means holding the housing concentric to the ring, an outer casing surrounding the housing, support rods extending between the ring and said casing to hold the ring in position, a fairing surrounding each rod and extending inwardly from the casing, vanes located circumferentially between adjacent rod fairings and rigidly attached to said casing, each of said rod fairings also being rigidly attached to said casing, in combination with an annular fairing surrounding said housing, and radially slidable connections between said annular fairing and each of said vanes and rod fairings.

5. A bearing support including a housing, a shaft in the housing, a bearing supporting the shaft within the housing, a ring surrounding the housing with means holding the housing concentric to the ring, an outer casing surrounding the housing, support rods extending between the ring and said casing to hold the ring in position, a fairing surrounding each rod and extending inwardly from the casing, vanes located circumferentially between adjacent rod fairings and rigidly attached to said casing, each of said rod fairings also being rigidly attached to said casing, in combination with an annular fairing surrounding said housing, and radially slidable connections between said annular fairing and each of said vanes and rod fairings, said annular fairing being out of contact with said housing and ring.

6. A bearing support including a shaft, a bearing supporting the shaft, a housing supporting the bearing, a casing surrounding the housing in spaced relation thereto, the casing forming the outer wall of a gas path through the casing, angularly spaced rods attached to and extending inwardly from the casing, a connecting means between the inner ends of the rods and the housing for supporting the housing, a fairing around each rod over that portion of that rod located within the gas path, said fairing having a rigid attachment to the casing and being out of contact with the surrounded rod, an annular fairing surrounding said housing and located within the casing to define the inner wall of said gas path, and radially slidable connections between said rod fairings and the annular fairing to provide for thermal expansion, said annular fairing being out of contact with said housing and said rods.

7. A bearing support including a shaft, a bearing supporting the shaft, a housing supporting the bearing, a casing surrounding the housing in spaced relation thereto, the casing forming the outer wall of a gas path through the casing, angularly spaced rods attached to and extending inwardly from the casing, a connecting means between the inner ends of the rods and the housing for supporting the housing, a fairing around each rod over that portion of that rod located within the gas path, said fairing having a rigid attachment to the casing and being out of contact with the surrounded rod, an annular fairing surrounding said housing and located within the casing to define the inner wall of said gas path, and radially slidable connections between said rod fairings and the annular fairing to provide for thermal expansion, said annular fairing being out of contact with said housing and said rods vanes located circumferentially between said rod fairings and rigidly attached to said casing, and radially slidable connections between said vanes and the annular fairing, said annular fairing being supported solely by said vanes and rod fairings.

References Cited in the file of this patent

UNITED STATES PATENTS

| | | |
|---|---|---|
| 2,516,819 | Whittle | July 25, 1950 |
| 2,616,662 | Mierley | Nov. 4, 1952 |
| 2,620,156 | Parducci | Dec. 2, 1952 |
| 2,640,315 | Secord | June 2, 1953 |
| 2,654,566 | Boyd et al. | Oct. 6, 1953 |
| 2,744,722 | Orr | May 8, 1956 |
| 2,799,472 | Rainbow | July 16, 1957 |

FOREIGN PATENTS

| | | |
|---|---|---|
| 500,381 | Canada | Mar. 2, 1954 |
| 530,032 | Canada | Sept. 4, 1956 |
| 750,421 | Great Britain | June 13, 1956 |